(12) United States Patent
Drexler et al.

(10) Patent No.: US 9,663,025 B2
(45) Date of Patent: May 30, 2017

(54) LIGHTING CONTROL SYSTEM AND METHOD FOR AUTONOMOUS VEHICLES

(71) Applicant: CLEARPATH ROBOTICS, INC., Kitchener (CA)

(72) Inventors: Simon Drexler, Kitchener (CA); Matthew Allen Rendall, Waterloo (CA); Ryan Christopher Gariepy, Kitchener (CA); Mike Hanuschik, Mountain View, CA (US); Paul Mohr, Mountain View, CA (US)

( * ) Notice: Subject to any disclaimer, the term of this patent is extended or adjusted under 35 U.S.C. 154(b) by 0 days.

(21) Appl. No.: 15/259,712

(22) Filed: Sep. 8, 2016

(65) Prior Publication Data

US 2017/0080850 A1 Mar. 23, 2017

Related U.S. Application Data

(60) Provisional application No. 62/220,391, filed on Sep. 18, 2015.

(51) Int. Cl.
| | |
|---|---|
| *B60Q 1/26* | (2006.01) |
| *B60Q 1/02* | (2006.01) |
| *B60Q 1/34* | (2006.01) |
| *B60Q 1/50* | (2006.01) |

(52) U.S. Cl.
CPC ............... *B60Q 1/26* (2013.01); *B60Q 1/02* (2013.01); *B60Q 1/34* (2013.01); *B60Q 1/50* (2013.01); *B60Q 2400/50* (2013.01); *B60Y 2200/40* (2013.01)

(58) Field of Classification Search
CPC .... G05D 1/0088; G05D 1/021; G05D 1/0212; G05D 1/0221; G05D 1/0242; G05D 1/0272; G05D 1/0274; G05D 1/0276; G05D 1/0278; G05D 1/0246; B60W 2420/42; B60W 2420/52; B60K 35/00; B60Q 1/00; B60Q 1/04; B60Q 1/52; B60Q 1/1423; B60Q 3/0293; H05B 33/0815; H05B 33/0803
USPC .............. 700/245, 249, 259; 701/25–27, 36; 340/425.5, 438; 315/77, 82, 294, 297, 315/307, 312
See application file for complete search history.

(56) References Cited

U.S. PATENT DOCUMENTS

| | | | | |
|---|---|---|---|---|
| 7,415,126 B2 * | 8/2008 | Breed | ....................... | B60J 10/00 382/100 |
| 8,599,001 B2 * | 12/2013 | Schofield | ............... | B60N 2/002 340/425.5 |
| 8,781,669 B1 * | 7/2014 | Teller | ..................... | G05D 1/021 700/245 |

(Continued)

*Primary Examiner* — Haissa Philogene

(57) ABSTRACT

A method of controlling an illumination system for an autonomous vehicle is provided. The method includes: storing, in a memory, a plurality of lighting pattern definitions for controlling the illumination system; receiving, at a processor connected to the memory and the illumination system, state data defining a current state of the autonomous vehicle; at the processor, determining whether each of a plurality of ranked sub-states is active in the autonomous vehicle, based on the state data; at the processor, selecting one of the lighting pattern definitions corresponding to the highest ranked sub-state determined to be active in the autonomous vehicle; and controlling the illumination system according to the selected lighting pattern definition.

20 Claims, 10 Drawing Sheets

(56) References Cited

U.S. PATENT DOCUMENTS

| | | | |
|---|---|---|---|
| 9,399,430 B2* | 7/2016 | Kirsch | B60Q 9/00 |
| 9,547,986 B1* | 1/2017 | Curlander | G08G 1/09 |
| 2017/0038775 A1* | 2/2017 | Park | G05D 1/0088 |

* cited by examiner

LIGHTING CONTROL SYSTEM AND METHOD FOR AUTONOMOUS VEHICLES

CROSS-REFERENCE TO RELATED APPLICATIONS

This application claims priority to U.S. provisional patent application No. 62/220391, filed Sep. 18, 2015, the contents of which is incorporated herein by reference.

FIELD

The specification relates generally to autonomous vehicles, and specifically to a lighting control system for autonomous vehicles.

BACKGROUND

The capabilities of autonomous vehicles (i.e. robots), and as a result the breadth of situations in which autonomous vehicles are employed, continues to grow. With the increasing capabilities and computational resources of such vehicles, their capability for operational independence also grows. As a result, less direct human control may be necessary for such vehicles. Although there are benefits to greater independence for autonomous vehicles, increased independence can also lead to insufficient information being readily available to human operators or bystanders relating to the vehicle's operation.

SUMMARY

An aspect of the specification provides a method of controlling an illumination system for an autonomous vehicle, the method comprising: storing, in a memory, a plurality of lighting pattern definitions for controlling the illumination system; receiving, at a processor connected to the memory and the illumination system, state data defining a current state of the autonomous vehicle; at the processor, determining whether each of a plurality of ranked sub-states is active in the autonomous vehicle, based on the state data; at the processor, selecting one of the lighting pattern definitions corresponding to the highest ranked sub-state determined to be active in the autonomous vehicle; and controlling the illumination system according to the selected lighting pattern definition.

Another aspect of the specification provides a system for controlling an illumination system of an autonomous vehicle, the system comprising: a memory storing a plurality of lighting pattern definitions for controlling the illumination system; a processor connected to the memory and the illumination system, the processor configured to: receive state data defining a current state of the autonomous vehicle; determine whether each of a plurality of ranked sub-states is active in the autonomous vehicle, based on the state data; select one of the lighting pattern definitions corresponding to the highest ranked sub-state determined to be active in the autonomous vehicle; and control the illumination system according to the selected lighting pattern definition.

BRIEF DESCRIPTIONS OF THE DRAWINGS

Embodiments are described with reference to the following figures, in which.

DETAILED DESCRIPTION OF THE EMBODIMENTS

Figure 1:
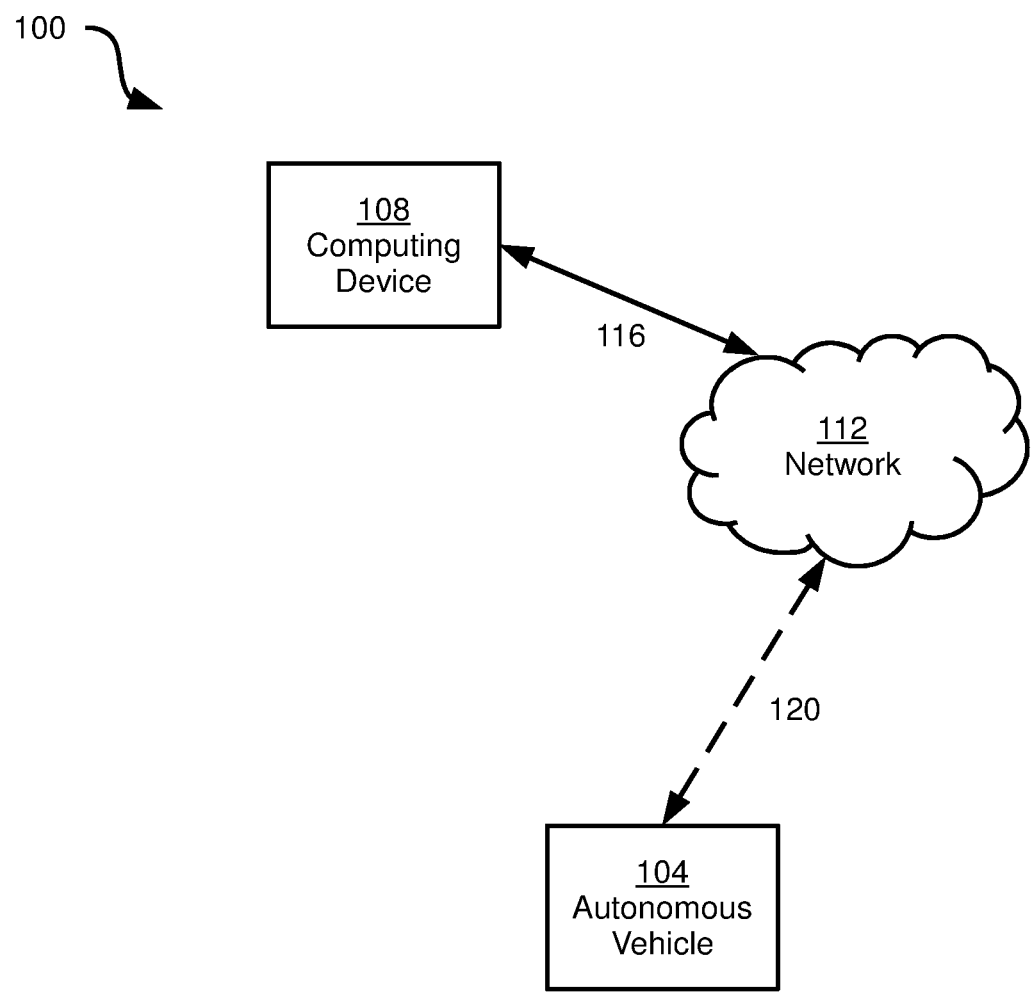
FIG. 1 depicts a system for the deployment of an autonomous vehicle, according to a non-limiting embodiment.

FIG. 1 depicts a system 100 including an autonomous vehicle 104 for deployment in a facility, such as a manufacturing facility, warehouse or the like. The facility can be any one of, or any suitable combination of, a single building, a combination of buildings, an outdoor area, and the like. A plurality of autonomous vehicles can be deployed in the facility. Autonomous vehicle 104 is also referred to herein simply as vehicle 104. Vehicle 104 need not be entirely autonomous. That is, vehicle 104 can receive instructions from human operators, computing devices and the like, from time to time, and can act with varying degrees of autonomy in executing such instructions.

System 100 can also include a computing device 108 for connection to vehicle 104 via a network 112. Computing device 108 can be connected to network 112 via, for example, a wired link 116, although wired link 116 can be any suitable combination of wired and wireless links in other embodiments. Vehicle 104 can be connected to network 112 via a wireless link 120. Links 120 can be any suitable combination of wired and wireless links in other examples, although generally a wireless link is preferable to reduce or eliminate obstacles to the free movement of vehicle 104 about the facility. Network 112 can be any suitable one of, or any suitable combination of, wired and wireless networks, including local area networks (LAN or WLAN), wide area networks (WAN) such as the Internet, and mobile networks (e.g. GSM, LTE and the like).

Computing device 108 can transmit instructions to vehicle 104, such as instructions to carry out tasks within the facility, to travel to certain locations in the facility, and the like. In general, the tasks assigned to vehicle 104 by computing device 108 require vehicle 104 to perform various actions at various locations within the facility. Data defining the actions and locations are provided to vehicle 104 by computing device 108 via network 112.

When vehicle 104 is assigned a task by computing device 108, vehicle 104 is configured to generate a path for completing the task (e.g. a path leading from the vehicle's current location to the end location of the task; the path may include one or more intermediate locations between the start location and the end location). In some embodiments, computing device 108 can assist vehicle 104 in path generation (also referred to as path planning), or can generate the path without the involvement of vehicle 104 and send the completed path to vehicle 104 for execution. Generation of the above-mentioned paths can be based on, for example, a map of the facility stored at either or both of computing device 108 and vehicle 104. Various mechanisms for path generation will be apparent to those skilled in the art; path generation is not directly relevant to the present disclosure, and is therefore not discussed in further detail herein.

Vehicle 104, in general, generates and executes commands to move about the facility, perform various tasks within the facility, and the like. In addition, vehicle 104 monitors various internal operational parameters, such as error and warning conditions (e.g. a low battery or other energy supply). Further, as will be discussed in greater detail herein, vehicle 104 is configured to detect objects (i.e. obstacles) in its vicinity. The presence or absence of objects, the task and movement commands, and the operational parameters mentioned above collectively define a current state of vehicle. As will be described herein, vehicle 104 includes an illumination system, and is configured to control the illumination system to signal its current state to outside viewers.

Before describing the above-mentioned control of the illumination system by vehicle 104, a brief description of certain components of vehicle 104 will be provided.

Figure 2:
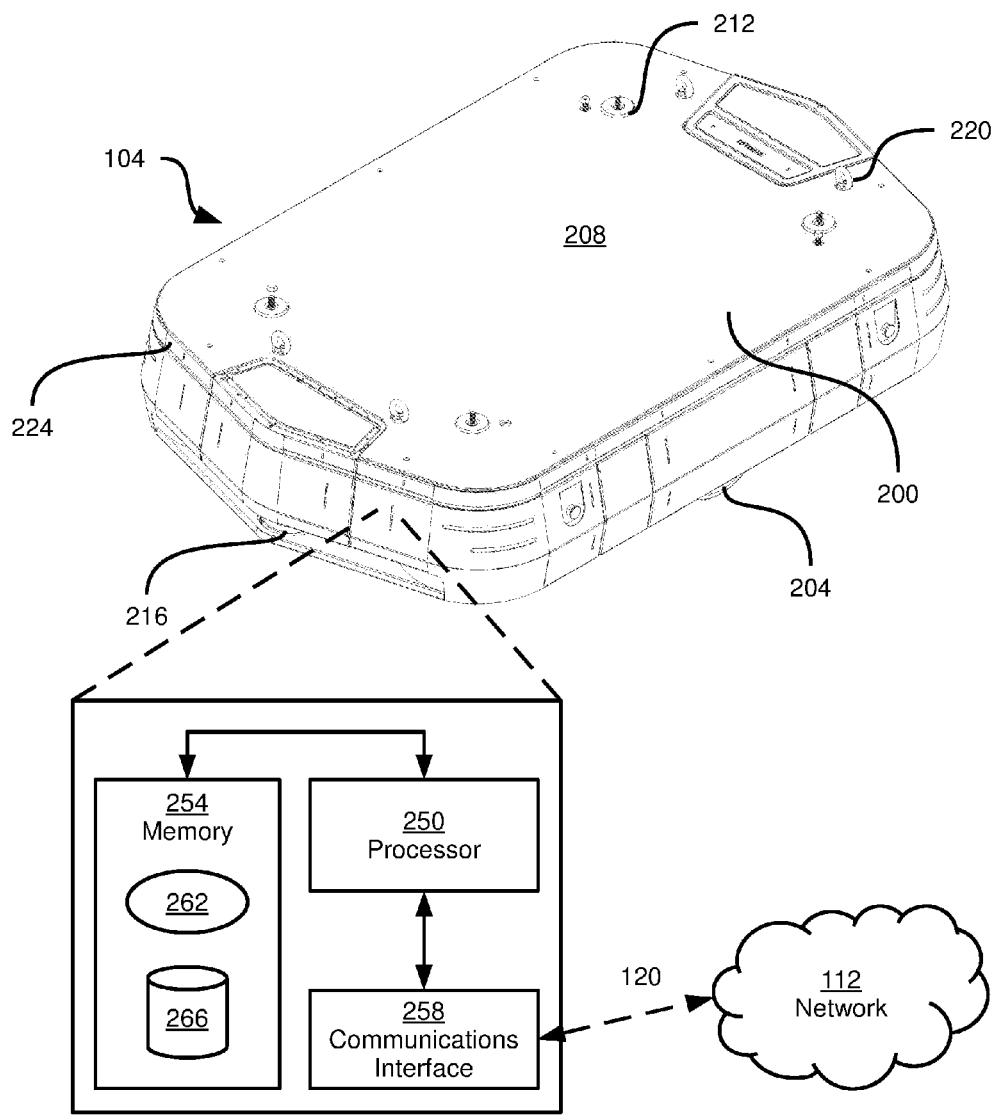
FIG. 2 depicts the autonomous vehicle of FIG. 1, according to a non-limiting embodiment.

Referring now to FIG. 2, an isometric view of autonomous vehicle 104 is shown, along with a block diagram of certain internal components of vehicle 104. Vehicle 104 is depicted as a terrestrial vehicle, although it is contemplated that vehicle 104, in other embodiments, can be an aerial vehicle or a watercraft. Vehicle 104 includes a chassis 200 containing or otherwise supporting various components, including one or more locomotive devices 204. Devices 204 in the present example are wheels. In other embodiments, however, any suitable locomotive device, or combination thereof, may be employed (e.g. tracks, propellers, and the like).

Locomotive devices 204 are driven by one or more motors (not shown) contained within chassis 200. The motors of vehicle 104 can be electric motors, internal combustion engines, or any other suitable motor or combination of motors. In general, the motors drive locomotive devices 204 by drawing power from an energy storage device (not shown) supported on or within chassis 200. The nature of the energy storage device can vary based on the nature of the motors. For example, the energy storage can include batteries, combustible fuel tanks, or any suitable combination thereof.

Vehicle 104, in the present embodiment, also includes a load-bearing surface 208 (also referred to as a payload surface), upon which items can be placed for transportation by vehicle 104. In some examples, payload surface 208 can be replaced or supplemented with other payload-bearing equipment, such as a cradle, a manipulator arm, or the like.

Vehicle 104 can also include a variety of sensors. In the present example, such sensors include at least one load cell 212 coupled to payload surface 208, for measuring a force exerted on payload surface 208 (e.g. by an item being carried by vehicle 104). The sensors of vehicle 104 can also include one or more machine vision sensors 216, such as any suitable one of, or any suitable combination of, barcode scanners, laser-based sensing devices (e.g. a LIDAR sensor), cameras and the like. Vehicle 104 can also include a location sensor (not shown) such as a GPS sensor, for detecting the location of vehicle 104 with respect to a frame of reference. The frame of reference may be, for example, a global frame of reference (e.g. GPS coordinates), or a facility-specific frame of reference. Other sensors that can be provided with vehicle 104 include accelerometers, fuel-level or battery-level sensors, and the like.

Vehicle 104 can also include anchors 220 for securing items or other equipment to chassis 200, or for lifting chassis 200 (e.g. for maintenance). In addition, vehicle 104 includes an illumination system 224. In general, illumination system 224 is configured to emit visible light from at least a portion of chassis 200. In the present embodiment, illumination system 224 includes an array of light-emitting components, such as light emitting diodes (LEDs) extending substantially entirely around the perimeter of chassis 200. In the present embodiment, the LEDs are individually addressable and each capable of emitting multiple colours (e.g. red, green and blue). In other embodiments, each LED can be a single-colour LED.

In other embodiments, other light-emitting components can be employed instead of, or in addition to, the above-mentioned LEDs. For example, the array shown in FIG. 1 can be replaced by a substantially annular display panel (e.g. an LCD or OLED display) extending around chassis 200. In further embodiments, the illumination system can include one or more projectors (not shown) supported by chassis 200. For example, forward and rear-facing projectors can be disposed at opposite ends of chassis 200 (e.g. with one of the projectors adjacent to sensor 216). In further embodiments, any suitable combination of projectors, with any suitable orientation, can be supported by chassis 200.

In addition, vehicle 104 includes a central processing unit (CPU) 250, also referred to as a processor 250, interconnected with a non-transitory computer-readable medium such as a memory 254. Processor 250 and memory 254 are generally comprised of one or more integrated circuits (ICs), and can have a variety of structures, as will now occur to those skilled in the art (for example, more than one CPU can be provided). Memory 254 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Vehicle 104 also includes a communications interface 258 (e.g. a network interface controller or NIC) interconnected with processor 250. Via communications interface 258, link 120 and network 112, processor 254 can send and receive data to and from computing device 108. For example, vehicle 104 can send updated location data to computing device 108, and receive instructions (e.g. tasks to be performed within the facility) from computing device 108. Additionally, processor 250 is interconnected with the other components of vehicle 104 mentioned above, such as sensors 212 and 216, and illumination system 224.

Memory 254 stores a plurality of computer-readable programming instructions, executable by processor 250, in the form of various applications, including an illumination control application 262 (also referred to herein as application 262). As will be understood by those skilled in the art, processor 250 can execute the instructions of application 262 (and any other suitable applications stored in memory 254) in order to perform various actions defined within the instructions. In the description below processor 250, and more generally vehicle 104, is said to be "configured to"

perform certain actions. It will be understood that vehicle 104 is so configured via the execution of the instructions of the applications stored in memory 254. Those skilled in the art will appreciate that in some embodiments, the functionality of processor 250 executing application 262 can be implemented using pre-programmed hardware or firmware elements (e.g., application specific integrated circuits (ASICs), electrically erasable programmable read-only memories (EEPROMs), etc.), or other related components.

Memory 254 also stores lighting pattern definitions 266, for use by processor 250 in controlling illumination system 224. In general, as will be discussed in greater detail below, lighting pattern definitions 266 define a plurality of lighting patterns for controlling illumination system 224. Each lighting pattern definition also defines conditions under which that lighting pattern definition is to be employed to control illumination system 224. The contents of lighting pattern definitions 266 and the selection of a lighting pattern definition for controlling illumination system 224 will be described in greater detail below.

Figure 3:
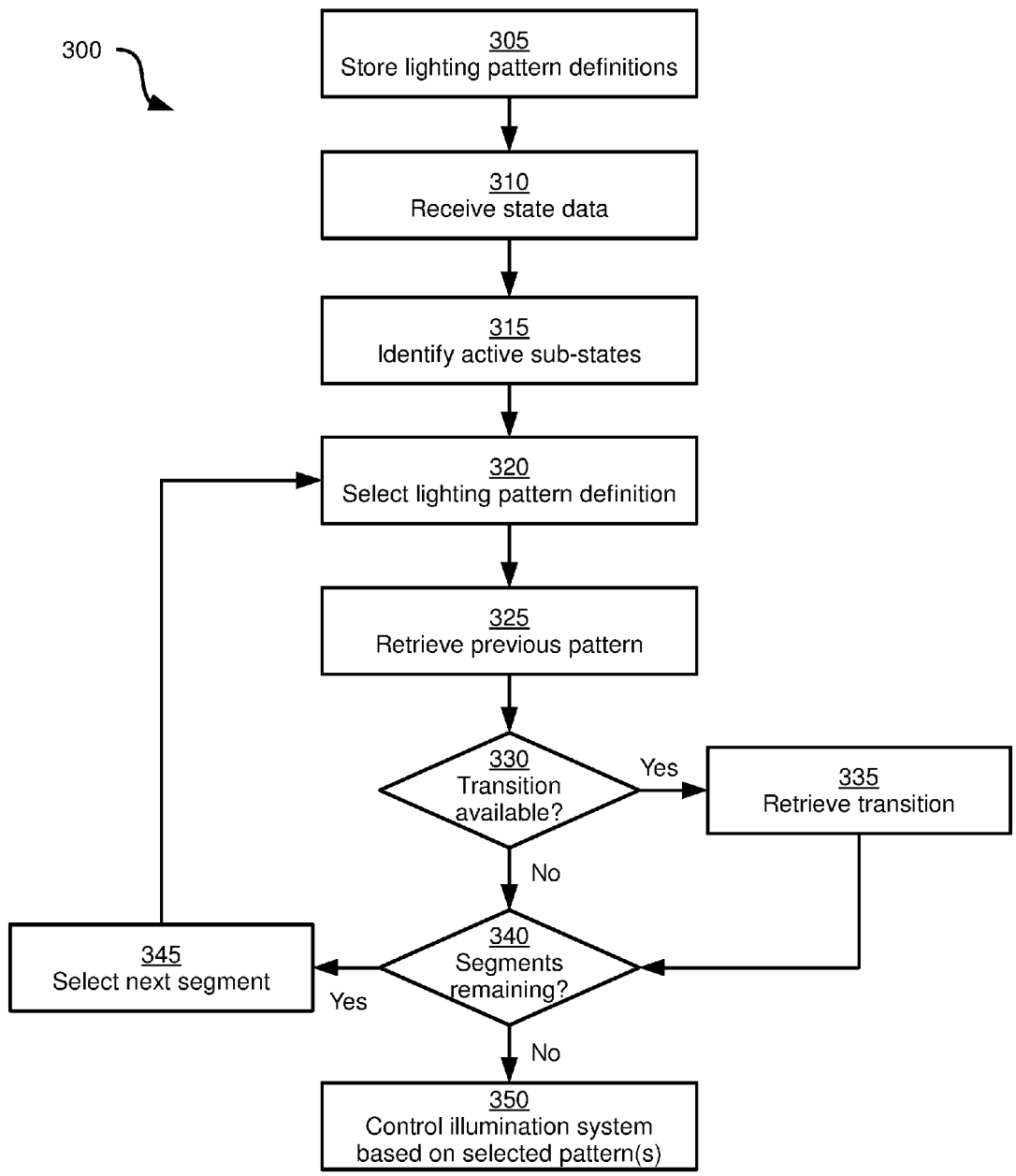
FIG. 3 depicts a method of controlling an illumination system for the autonomous vehicle of FIG. 2, according to a non-limiting embodiment.

Referring now to FIG. 3, a method 300 of controlling an illumination system for an autonomous vehicle is depicted. The performance of method 300 will be described in connection with its performance in system 100, although it is contemplated that method 300 can also be performed in other suitable systems. The blocks of method 300 as described below are performed by vehicle 104, via the execution of application 262 by processor 250. In other embodiments, however, some or all or method 300 can be performed by computing device 108.

Beginning at block 305, vehicle 104 is configured to store lighting pattern definitions 266, as mentioned above. Lighting pattern definitions 266 can be stored in the form of a database, flat file, or any other suitable data structure. In general, lighting pattern definitions 266 contains a plurality of records, with each record including one or more parameters for controlling a illumination system 224. As will be seen below, some records include parameters for controlling only certain portions of illumination system 224. The parameters in the lighting pattern definition records can vary widely. Table 1 illustrates non-limiting examples of lighting pattern definitions.

TABLE 1

Example Lighting Pattern Definitions 266

| Pattern ID | Segment ID | Corresponding State | Pattern Parameters |
|---|---|---|---|
| P-00 | Array 1, 2, 3, 4 | Idle | Colour: white<br>Brightness: 40%<br>Distribution: solid |
| P-01 | Array 3, 4 | Mode/Docking | Colour: yellow<br>Distribution: 5 sections<br>Frequency: 1 Hz |
| P-02 | Array 1, 2 | Trajectory | Colour: white<br>Distribution: 2 sections<br>Alignment: direction of path |
| P-03 | Projector | Trajectory | Image: arrow<br>Alignment: direction of path |
| P-04 | Array 1, 2 | Environmental/Object | Colour:<br>Distribution: 1 per object<br>Alignment: direction of object |
| P-05 | Array 3, 4 | Warning/Low Battery | Colour: red<br>Distribution: 5 sections<br>Frequency: 1 Hz |
| P-06 | Array 3, 4 | Warning/Repair | Colour: yellow<br>Distribution: 1 section |
| P-07 | Array 1, 2, 3, 4 | Error/E-Stop | Colour: red<br>Brightness: 100%<br>Distribution: solid |

As seen in Table 1, lighting pattern definitions 266 includes a plurality of records, each defining a lighting pattern—that is, a set of parameters used by processor 250 to control illumination system 224. In the above example, each record is identified by a pattern identifier (e.g. "P-00" and so on), although such an identifier can be omitted in other embodiments.

Each lighting pattern definition record also includes an indication of a state of vehicle 104 in which the pattern is to be used to control illumination system 224. The state in which each pattern is to be used is illustrated above in the "Corresponding State" column in Table 1. As will be discussed below in greater detail, the state of vehicle 104 is defined by state data received at processor 250. The state data indicates which ones of a plurality of sub-states are active in vehicle 104, and can also include data defining the active sub-states. For example, one sub-state may be a "warnings" sub-state, and the state data may indicate that a low battery warning is active. As seen above, the pattern "P-05" is configured for use when a low battery warning is present.

Each lighting pattern definition record further includes lighting parameters for controlling illumination system 224. Any combination of a wide variety of lighting parameters may be employed. The lighting parameters can define any one or more of colour, brightness, images to be projected (when illumination system 224 includes a projector), areas or shapes to be illuminated (for example, identifying certain portions of the above-mentioned array of LEDs) and the distribution of such areas (e.g. the spacing between the areas, the locations of the areas on the array of LEDs), and the like. Other parameters are also contemplated, including frequency parameters defining a frequency at which illumination system 224 (or certain areas thereof) will flash when under the control of the relevant pattern definition.

As will be apparent from Table 1, the lighting parameters can also include variable parameters whose values depend on other data available to processor 250. For example, the pattern "P-03" specifies that an arrow image is to be projected not in any predefined direction, but rather in the direction (either current or planned) of travel of vehicle 104. Various example parameters in addition to those shown in Table 1 will occur to those skilled in the art throughout this document. It is also noted that a wide variety of formats may be employed to store the lighting parameters. Although the lighting parameters are presented in plain language in Table 1 for the purpose of illustration, it will now be apparent to those skilled in the art that any of a wide variety of formats can be employed to store the lighting parameters, depending on the requirements of processor 250 and illumination system 224.

In addition, as shown in Table 1, each lighting pattern definition record can include one or more segment identifiers each corresponding to one or more predefined portions of illumination system 224. In the present example, in which illumination system 224 includes a projector and the above-mentioned array of LEDs, the segment identifiers correspond, respectively, to the projector and each of the four sides of the array. A wide variety of other segment identifiers are also contemplated (for example, the array can be divided into a greater or smaller number of separately controllable segments, and the segments need not be aligned with the sides shown in FIG. 2). The use of segment identifiers by processor 250 will be described below in greater detail.

At block 310, processor 250 is configured to receive state data defining a current state of vehicle 104. The state data can be received from various sources, including internal sensors and other systems housed within chassis 200, and computing device 108. In general, the state data can include any one of, or any combination of, trajectory data, environmental data, and control data.

Trajectory data defines a trajectory of vehicle 104. Trajectory data can therefore include the current location and velocity of vehicle 104 (either received from computing device 108 or from onboard sensors such as a GPS sensor within chassis 200). Trajectory data can also include planned locations and velocities of vehicle 104, in the form of one or more sets of path data, each set identifying a sequence of locations (and, in some embodiments, accompanying vectors) to which vehicle 104 is to travel. The trajectory data can also include locomotion commands (e.g. defined as vectors consisting of a direction and a speed; or defined as power instructions to the motors driving wheels 204) generated by either or both of processor 250 and computing device 108 based on the path data. The generation of the path data can be performed in a wide variety of ways. For example, the path data can include a global path identifying a target location, and a local path identifying a series of intermediate locations that vehicle 104 will traverse to reach the target location. In some embodiments, the global path can be generated by computing device 108 while the local path can be generated by processor 250 itself. In other embodiments, both the global and local paths can be generated by computing device 108, or by processor 250.

Environmental data defines at least one object in the vicinity of vehicle 104. For example, processor 250 can be configured to detect objects within the field of view of a sensor such as sensor 216, and to determine the position of such objects in relation to vehicle 104. In some embodiments, the environmental data can also include mapping data stored in memory 254 or received from computing device 108 and identifying the locations of one or more objects within the facility mentioned earlier. Environmental data can also include indications of whether the objects detected in the vicinity of vehicle 104 are in stationary or in motion. When the objects are in motion, the environmental data can also include vector data defining the direction and velocity of travel of the objects (either in relation to vehicle 104 or in relation to another frame of reference, such as one specific to the facility in which vehicle 104 is deployed).

Control data defines various operational parameters of vehicle 104, received at processor 250 from sensors and other components supported by chassis 200. For example, the control data can include indications of any warning conditions that are active (e.g. a low battery warning), any error conditions that are active (e.g. an emergency stop error), and identifiers of any discrete operating modes currently active in vehicle 104. An example of a discrete operating mode is a docking mode, in which vehicle 104 is configured to perform a predetermine sequence of movements to approach or couple with other equipment in the facility. The operational parameters can also include any of a variety of diagnostic data collected by processor 250 from sensors onboard vehicle 104. For example, the operational parameters can include data indicating wear on certain components (e.g. the motors driving wheels 204), data indicating failures of certain components, and the like.

Having received the state data, at block 315 processor 250 is configured to identify any active sub-states based on the state data. In the present example, the identification is performed by determining, at processor 250, whether each of a plurality of previously defined sub-states is active based on the state data. The sub-states are ranked in order of their importance to the control of illumination system 224. An example of sub-states to be evaluated at block 315 is shown below in Table 2.

TABLE 2

Example Sub-States

| Sub-State | Rank | Activity Condition |
| --- | --- | --- |
| Idle | 1 | N/A |
| Discrete Mode | 2 | >0 discrete modes active |
| Motion | 3 | path execution in progress |
| Objects | 4 | >0 objects detected |
| Warnings | 5 | >0 warnings active |
| Errors | 6 | >0 errors active |

As seen above, each sub-state includes a rank, with the higher ranks being more important to the control of illumination system 224, as will be discussed below in greater detail. Each sub-state record also includes one or more activity conditions, which can be evaluated by processor 250 to determined whether the corresponding sub-state is currently active. In other embodiments, rather than refer to activity conditions as shown above, processor 250 can determine which sub-states are active based on the origins of the above-mentioned state data. For example the receipt of data from a warnings sub-system of vehicle 104 can indicate to processor 250 that the warnings sub-state is active.

Based on the contents of Table 2, a wide variety of other sub-states and rankings will now be apparent to those skilled in the art. The contents of Table 2, or any other suitable ranked listing of sub-states, can be stored in memory 254 (for example, within application 262 or as a separate database or other data structure).

Figure 4:
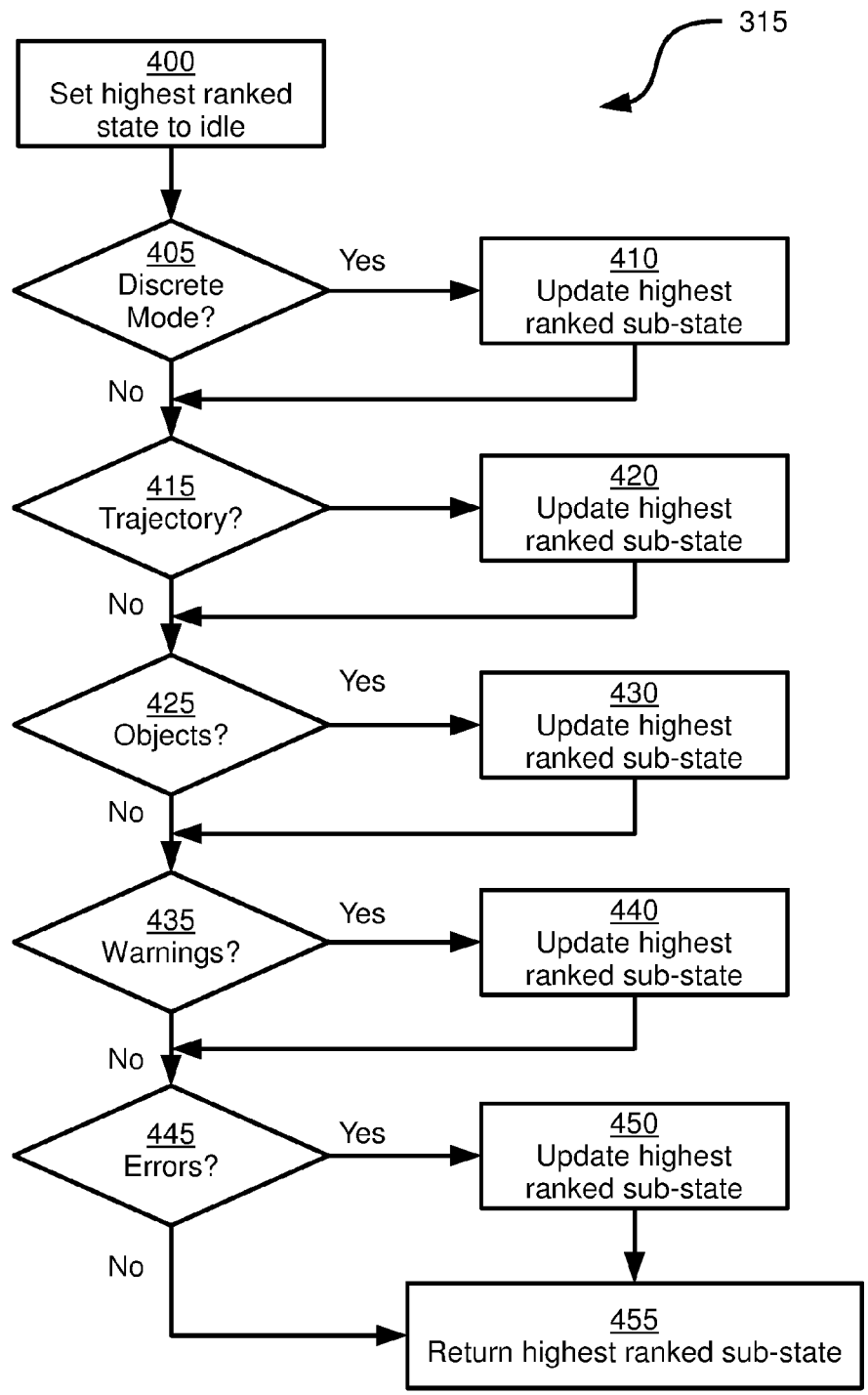
FIG. 4 depicts a method for performing block 315 of the method of FIG. 3, according to a non-limiting embodiment.

Turning briefly to FIG. 4, an example implementation of block 315 of FIG. 3 is illustrated, based on the contents of Table 2. Beginning at block 400, processor 250 is configured to set the highest ranked active sub-state to "idle". In other embodiments, processor 250 can first determine whether the idle sub-state is indeed active, for example if there are lower-ranked sub-states and certain conditions must be satisfied to enter the idle state. The current highest ranked active sub-state can be stored in memory 254.

At block 405, processor 250 is configured to determine whether the operational data of the state data received at block 310 indicates that a discrete operating mode (such as a docking mode) is active. When the determination at block 405 is affirmative, processor 250 is configured to update the highest ranked active sub-state at block 410, by replacing the identification of the idle sub-state with the identification of the discrete mode sub-state. The above procedure is then repeated for each of the remaining sub-states. In other words, processor 250 is configured to determine, at blocks 415, 425, 435 and 445 respectively, whether the trajectory, objects, warnings and errors sub-states are active based on the state data and the conditions in Table 2. For each affirmative determination, processor 250 is configured to replace the current highest ranked active sub-state in memory 254 (at blocks 420, 430, 440 and 450, respectively) with the sub-state most recently determined to be active. Finally, at block 455, processor 250 is configured to return (that is, to the primary processing routine shown in FIG. 3) the current highest ranked sub-state. Thus, the performance of block 315, in the present example, consists of a series of determinations, in which positive results override any previous positive results.

Returning to FIG. 3, having identified the active sub-states (for example, via the process shown in FIG. 4), processor 250 is configured to perform block 320. At block 320, processor 250 is configured to select a lighting pattern definition corresponding to the highest ranked active sub-state. More specifically, processor 250 is configured to select, from Table 1 or any other suitable set of lighting pattern definitions, the record corresponding to the highest ranked active sub-state. In the present example, if the highest ranked active sub-state is "Idle", then the record "P-00" from Table 1 is selected at block 320.

In some embodiments, lighting pattern definitions 266 include more than one lighting pattern record for a given sub-state. For example, records P-05 and P-06 both relate to the "warnings" sub-state. In such embodiments, processor 250 is configured to select the subset of records corresponding to the highest ranked active sub-state, and then to select from that subset the lighting pattern corresponding to the state data. For example, if the state data indicates that a low battery warning is present, and the warnings sub-state is the highest ranked active sub-state, then processor 250 is configured to select from patterns P-05 and P-06 based on the state data. Since the state data includes the warning condition identifier "low battery", the pattern P-05 is selected.

Having selected a lighting pattern definition, in some embodiments processor 250 can be configured to proceed directly to block 350, and control illumination system 224 according to the selected lighting pattern definition. In the present example, however, processor 250 is configured to perform additional actions prior to controlling illumination system 224. The additional actions performed by processor 250, which are described below, include retrieving a transitional lighting pattern (where available) and selecting additional lighting patterns for other segments of illumination system 224.

At block 325, processor 250 is configured to retrieve an identifier of the previously selected lighting pattern definition. For example, upon completion of a performance of method 300, processor 250 can store, for instance in a cache in memory 254, an identifier of the selected lighting pattern definition (or definitions), for use in subsequent performances of method 300. The previous lighting pattern identifier retrieved at block 325 identifies the lighting pattern that is currently being used to control illumination system 224.

Having retrieved the identifier of the previous lighting pattern definition, processor 250 is configured, at block 330, to determine whether a transitional lighting pattern between the previous lighting pattern and the lighting pattern selected at block 320 is available. Memory 254 can contain a set of transitional lighting patterns defining lighting parameters for transitioning between different records in lighting pattern definitions 266. In other embodiments, such transitional lighting patterns can be stored directly in lighting pattern definitions 266. In general, a transitional lighting pattern definition identifies a source lighting pattern and a destination lighting pattern, and includes lighting parameters such as colour, brightness and the like, described above. For example, a transitional lighting pattern between patterns P-00 and P-02 may include lighting parameters for controlling the array of LEDs to fade the solid white colour of P-00 down to zero brightness over a specified period of time before fading the two white sections (e.g. headlights) up to a specified brightness over a second period of time.

When a transitional lighting pattern is available, processor 250 is configured to retrieve the transitional lighting pattern from memory 254 at block 335. When no transitional lighting pattern is available, processor 250 is instead configured to proceed to block 340.

At block 340, processor 250 is configured to determine whether any segments of illumination system 224 remain to be processed. As noted above, each lighting pattern definition record can include a segment identifier identifying a portion of illumination system 224. As seen in Table 1, some lighting pattern definition records correspond to specific segments of illumination system 224 (e.g. only certain sides of the array of LEDs, or only the projector). In such embodiments, in the course of one performance of method 300 processor 250 is configured to repeat the performance of blocks 320, 325, 330, and 335 for each segment of illumination system 224. Thus, at block 340, processor 250 is configured to determine whether, for the current performance of method 300, blocks 320-335 have not yet been performed. When the determination is affirmative, processor 250 is configured to select the next un-processed segment and proceed to block 320 (the same state data and active sub-states can be employed for all segments).

It will now be apparent to those skilled in the art that for some segments, there may not exist a lighting pattern definition record for the highest ranked active sub-state. For example, referring to Table 1, there are no lighting pattern definition records for the segments Array 1 and Array 2 that correspond to the sub-state "Mode". In such situations, processor 250 can be configured to store an ordered list of all active sub-states at block 315, rather than a single highest ranked active sub-state. Thus, when no lighting pattern definition record exists for the highest ranked active sub-state, processor 250 can search for a lighting pattern definition record corresponding to the next highest ranked active sub-state, and (if necessary). If processor 250 determines that there are no lighting pattern definition records for the relevant segment corresponding to any of the active sub-states, then processor 250 is configured to set the lighting pattern for that segment to null at block 320 and proceed to process the next segment.

When the determination at block 340 is negative—that is, when all segments have been processed—processor 250 is configured to proceed to block 350. At block 350, processor 250 is configured to control illumination system 224 according to the selected lighting pattern definition.

As will now be apparent to those skilled in the art, when multiple lighting pattern definitions were selected during the performance of method 300, at block 350 processor 250 is configured to control illumination system 224 based on each selected lighting pattern definition. Thus, when illumination system 224 includes a plurality of segments, processor 250 is configured to control each segment based on the corresponding selected lighting pattern definition. In some embodiments, processor 250 can issue independent instructions to the various segments of illumination system 224. For example, when illumination system 224 includes a projector and an array of LEDs, processor 250 can be configured to transmit instructions to the projector separately from the array.

Processor 250 can also, however, be configured to mix the selected lighting pattern definitions for the respective segments to generate a single mixed lighting pattern definition. Processor 250 can then be configured to instruct illumination system 224 on the basis of the mixed lighting pattern definition. For example, the above-mentioned array of LEDs can be controlled by processor 250 via such a mixed lighting pattern definition, constructed from lighting pattern definitions selected for each segment of the array as defined in Table 1.

Further, processor 250 can be configured to control illumination system 224 (or certain segments thereof) based on both the pattern definitions selected at block 320 and any transitional lighting patterns retrieved at block 335. For a given segment, the transitional pattern and the selected pattern can be mixed together before transmission to illumination system 224.

For certain lighting pattern definitions, the performance of block 350 consists of sending the lighting parameters to illumination system 224. For other lighting pattern definitions, however, processor 250 is configured to perform additional actions at block 350 to control illumination system 224.

For example, when a lighting pattern definition includes variable lighting parameters, such as the path direction of pattern P-03 in Table 1, at block 350 processor 250 is configured to determine a direction. The determination of a direction (e.g. in which to project the arrow image referred to by pattern P-03) can be based on either or both of a global and local path stored in memory 254. In some embodiments, the pattern itself can specify whether a global path or a local path are to be considered in controlling illumination system 224. Further, processor 250 can be configured to generate a direction based on a weighted combination of inputs, such as a direction of a global path, a direction of a local path, and a direction specified by a locomotion command whose execution is beginning (that direction may not exactly match the local path). The paths can also be limited and smoothed by processor 224 prior to control of illumination system 224.

As a further example, a lighting pattern definition contains variable parameters such as the object direction and closest object selection of pattern P-04, processor 250 is configured to select the specified number of objects based on the criteria (e.g. distance from vehicle 104) specified in the pattern definition. Processor 250 can also be configured, in some embodiments, to determine motion vectors of the objects, and to perform a vector simplification process on such motion vectors prior to transmitting the lighting parameters to illumination system 224.

Figure 5A:
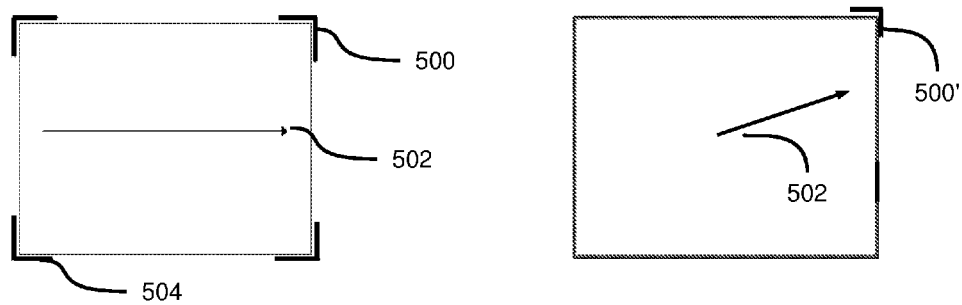
FIGS. 5A-5C depict example results of the performance of the method of FIG. 3, according to a non-limiting embodiment.

Various examples of the results of performing block 350 at processor 250 will now be discussed, with reference to FIGS. 5-10. Referring to FIG. 5A, a pattern defining headlights 500 on the array of LEDs (on the "forward" segment of the array, based on the direction of motion of vehicle 104, illustrated by arrow 502), and a second pattern defining tail lights 504 on the array, are illustrated. When the direction of travel of vehicle 104 changes (as illustrated by arrow 502'), the headlights can be repositioned (as shown by headlights 500') in the new direction of travel. As will now be apparent to those skilled in the art, headlights 500 can be defined by a pattern definition similar to P-02 shown in Table 1.

Figure 5B:
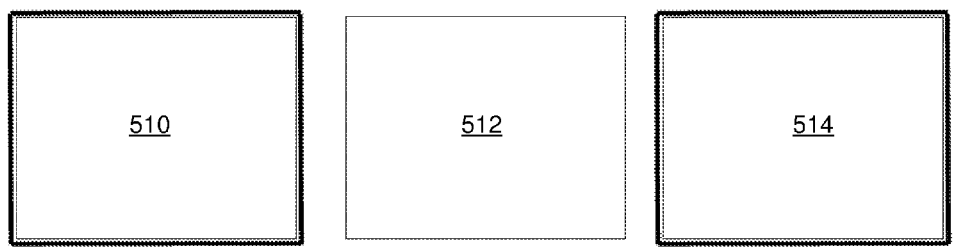

Referring to FIG. 5B, the array of illumination system 224 is shown in three successive states 510, 512 and 514, in which all segments of the array are illuminated at a frequency (e.g. 1 Hz) specified by a lighting pattern definition.

Figure 5C:
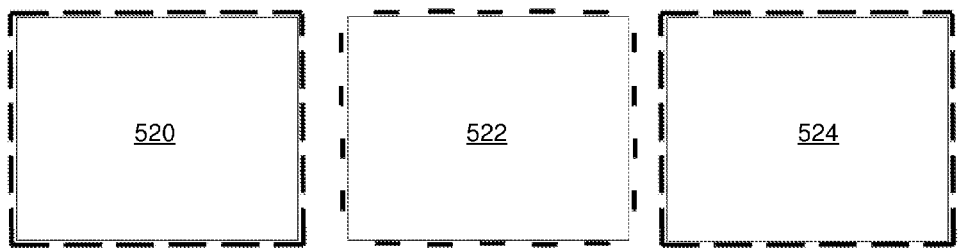

Referring to FIG. 5C, the array of illumination system 224 is shown in three successive states 520, 522 and 524, in which all segments of the array are illuminated with two sets of discrete sections specified by a lighting pattern definition, alternating at a frequency (e.g. 1 Hz) specified by the lighting pattern definition.

Figure 6A:
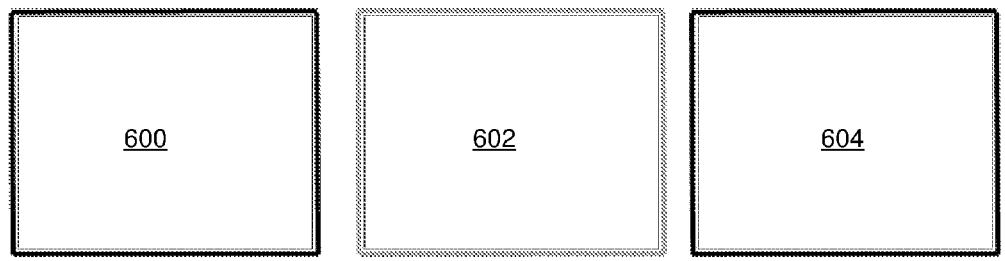
FIGS. 6A-6C depict additional example results of the performance of the method of FIG. 3, according to a non-limiting embodiment.

Referring to FIG. 6A, vehicle 104 is shown in three states 600, 602 and 604, illustrating a variant of the pattern shown in FIG. 5B, in which all segments of the array are reduced in brightness at a given frequency rather than being turned off as in state 512.

Figure 6B:
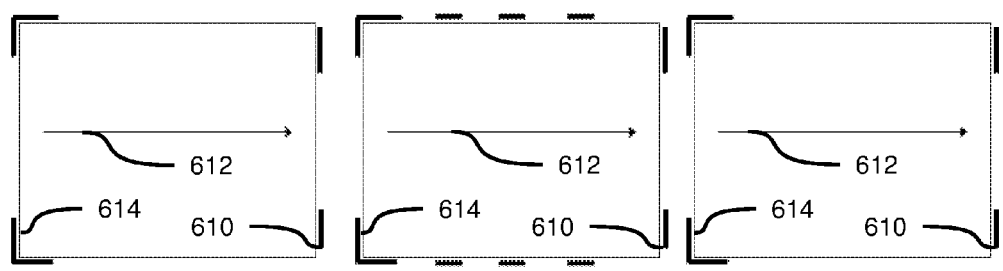

Referring to FIG. 6B, a combination of three lighting pattern definitions is illustrated. In particular, headlights 610 defined by a first pattern are illustrated in a forward direction (as indicated by arrow 612); tail lights 614 defined by a second pattern are illustrated in a rearward direction; and a set of discrete sections of the array distributed along the sides of vehicle 104 are activated according to a third pattern (e.g. representing hazard lights in a warning sub-state), flashing at a frequency defined in the third pattern.

Figure 6C:
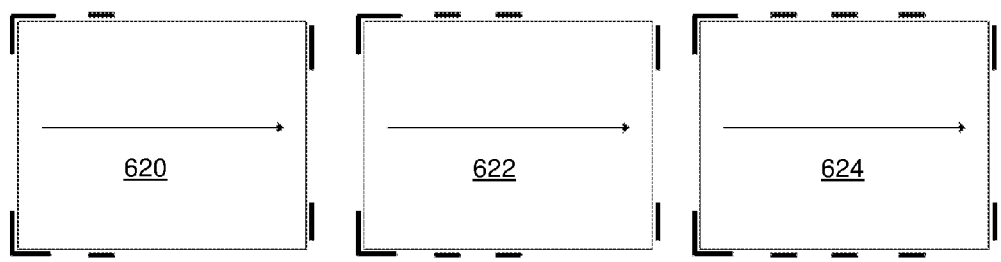

Referring to FIG. 6C, vehicle 104 is shown in three states 620, 622 and 624. The headlight and tail light patterns of FIG. 6B are illustrated, and a variant of the third "hazard" pattern of FIG. 6B is also illustrated, in which the discrete sections of the array are activated in a sequence giving the appearance of motion. The sequence may be repeated at a frequency defined by the above-mentioned pattern definition.

Figure 7A:
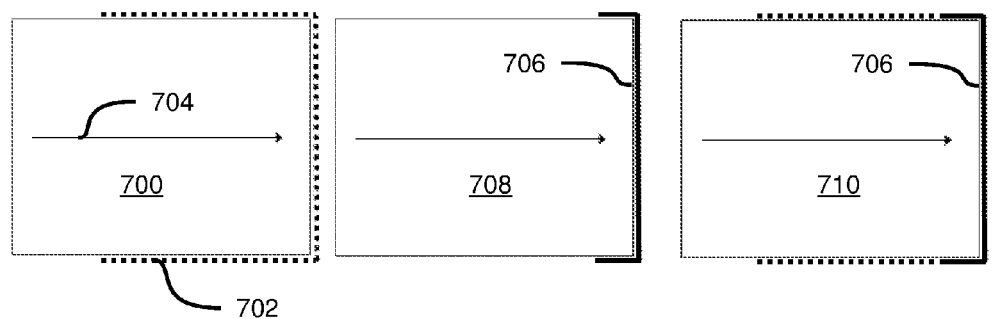
FIGS. 7A-7C depict further example results of the performance of the method of FIG. 3, according to a non-limiting embodiment.

Referring to FIG. 7A, a more complex example of a lighting pattern definition corresponding to a trajectory sub-state is illustrated. In particular, in an initial state 700, the array is controlled by processor 250 to activate a plurality of discrete sections 702 that gather in a planned direction of travel 704 (that is, a direction specified by path data), prior to actual movement of vehicle 104. The array of illumination system 224 is then configured to display a single headlight 706 spanning the forward segment of the array in a second state 708, still prior to motion of vehicle 104. When motion begins (in a third state 710), processor 250 is configured to control the array to display headlight 706 as well as the discrete sections mentioned above, travelling now in a direction opposite the direction of travel.

Figure 7B:
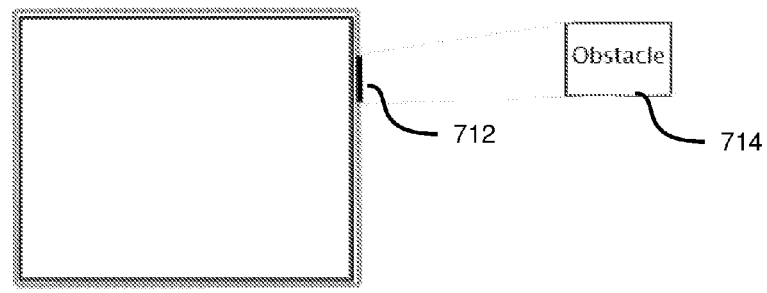

Referring to FIG. 7B, a section 712 (e.g. of length specified by the lighting pattern definition) of the array can be activated to indicate the position of an obstacle 714 detected by vehicle 104. For example, the lighting pattern definition may specify that the position of the activated section is to be determined by minimizing the distance between the activated section and the detected object.

Figure 7C:
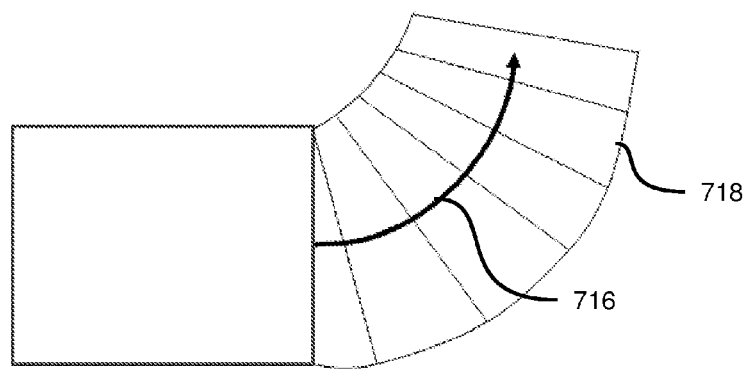

Referring to FIG. 7C, an example of projector lighting control is illustrated. In particular, an arrow 716 is shown projected in the direction of travel of vehicle 104 (as shown in pattern P-03 of Table 1 ). In addition, a safety, or exclusion, zone 718 can be projected on the surface over which vehicle 104 is travelling to illustrate the area to be occupied by vehicle 104. The width and length of the safety zone can be defined in the corresponding lighting pattern definition.

Figure 8:
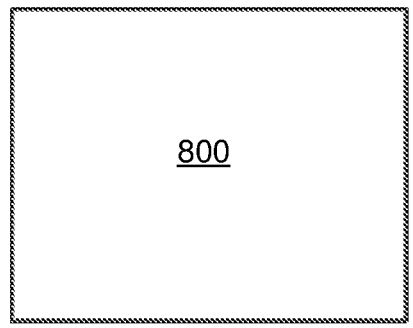
FIG. 8 depicts still further example results of the performance of the method of FIG. 3, according to a non-limiting embodiment.
Figure 8:
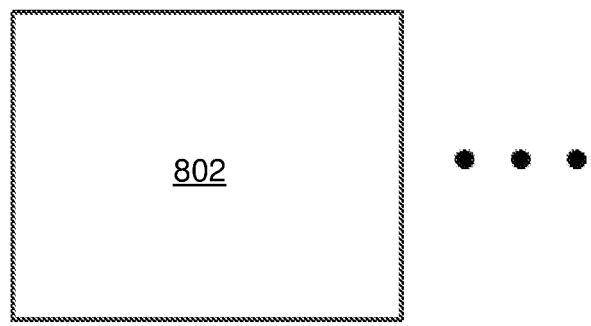
Figure 8:
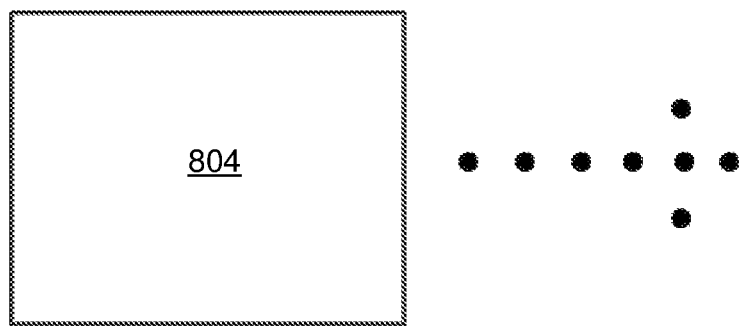

Referring to FIG. 8, a further projection lighting pattern is illustrated, consisting of three stages 800, 802 and 804. The stages are projected in sequence, to illustrate an arrow extending from vehicle 104 in a direction of travel. Thus, the underlying lighting pattern definition can refer to a plurality of images for projection (three images, in the present example), and can also specify the sequence of such images and the frequency with which the projector is to be controlled to switch between the images.

Figure 9A:
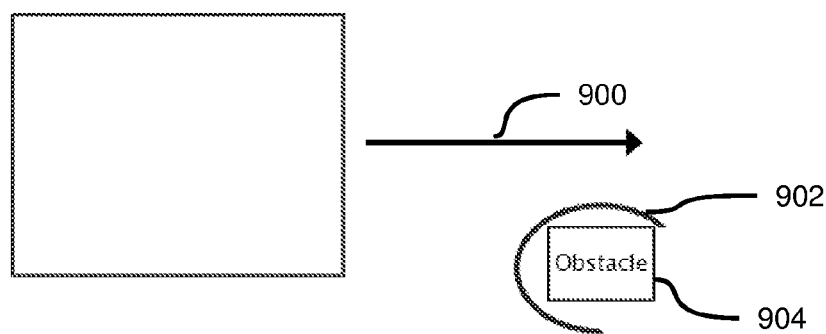
FIGS. 9A-9C depict still further example results of the performance of the method of FIG. 3, according to a non-limiting embodiment.

Referring to FIG. 9A, the results of block 350 based on two projection-based patterns are illustrated. In particular, a first pattern causes illumination system 224 (particularly, the projector) to project an arrow 900 indicating a direction of travel of vehicle 104. Further, a second pattern causes the projector to project a border 902 (e.g. on the surface over which vehicle 104 travels) around an obstacle 904 detected by vehicle 104.

Figure 9B:
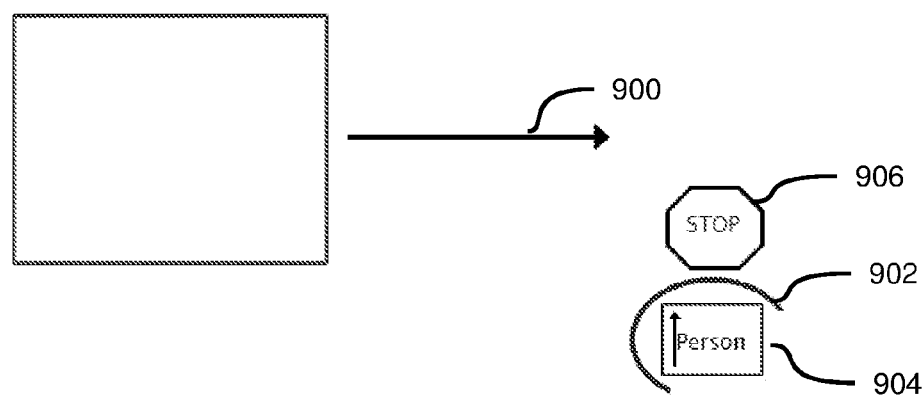

Referring to FIG. 9B, another variation is shown in which arrow 900 and border 902 are projected. In addition, processor 250 can be configured to determine (e.g. based on data from sensor 216, a camera or other input) whether obstacle 904 is a human. When the determination is affirmative, processor 250 can be configured to project an instruction to the obstacle while vehicle 104 is in motion, such as a stop sign 906.

Figure 9C:
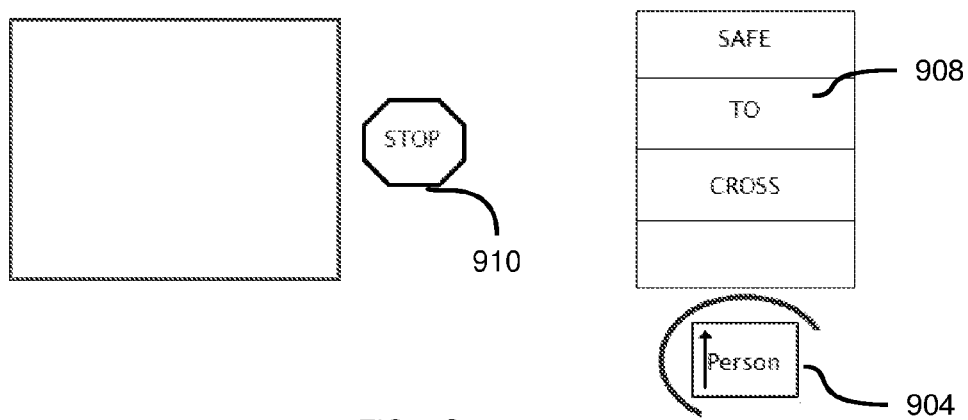

In FIG. 9C, vehicle 104 has altered its trajectory to come to a stop as a result of the detection of obstacle 904. Processor 250 therefore controls illumination system 224 to cease projecting arrow 900 (that is, the "motion" sub-state of Table 2 is determined to no longer be active). Instead, processor 250 controls the projector of illumination system 224 to continue projecting border 902, and to also project a crosswalk 908 and a stop sign 910 indicating that vehicle 104 will remain stationary.

Figure 10:
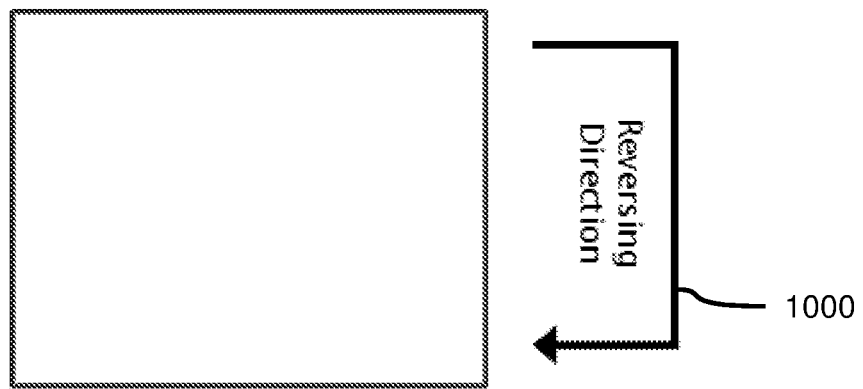
FIG. 10 depicts still further example results of the performance of the method of FIG. 3, according to a non-limiting embodiment.

FIG. 10 illustrates a further lighting pattern definition that can be employed to control the projector when path data indicates that vehicle 104 will reverse its direction of travel. In particular, a description 1000 of the planned change in trajectory is projected on the surface over which vehicle 104 travels.

Variations to the above systems and methods are contemplated. For example, in some embodiments, computing device 108 can perform portions of method 300, rather than processor 250. For example, computing device 108 can be configured to store lighting pattern definitions and receive state data from vehicle 104, and to select lighting pattern definitions for transmission to vehicle 104. In other words, in such embodiments, processor 250 performs only block 350 of method 300, while computing device 108 performs the remainder of method 300. Other subdivisions of method 300 between computing device 108 and vehicle 104 will also now be apparent to those skilled in the art.

In further embodiments, illumination system 224 and associated control hardware can be implemented as a separate module that is mountable on any of a variety of autonomous vehicles. In other words, illumination system 224 can be implemented as an augmentation for autonomous vehicles that otherwise lack the illumination functionality described above.

In such embodiments, the discrete module includes illumination system 224 as described above, as well as a processor, memory, and interface hardware for communicating with an on-board processor of the autonomous vehicle. Thus, when the discrete module is mounted on an autonomous vehicle, the autonomous vehicle may include two distinct computing devices—one supported within the discrete module and responsible for illumination control, and one contained within the vehicle and responsible for motion control (e.g. trajectory planning and the like, as mentioned earlier).

The discrete computing device configured to control the illumination system performs method 300 as shown in FIG. 3 and as described above. As will now be apparent, at block 310 the computing device configured to control the illumination system (i.e. the computing device housed in the discrete module) is configured to receive the state data from the computing device contained within the vehicle. That is, the vehicle computing device can be configured to receive the state data as described earlier herein, and to then transmit the state data to the illumination computing device. In some embodiments, the illumination computing device can instead be configured to intercept the state data, so as to receive the state data without requiring any additional activity on the part of the vehicle computing device. For example, the discrete module can include electrical contacts for connecting to various data buses of the vehicle computing device, to permit the illumination computing device to capture the state data.

The scope of the claims should not be limited by the embodiments set forth in the above examples, but should be given the broadest interpretation consistent with the description as a whole.

We claim:

1. A method of controlling an illumination system for an autonomous vehicle, the method comprising:
storing, in a memory, a plurality of lighting pattern definitions for controlling the illumination system;
receiving, at a processor connected to the memory and the illumination system, state data defining a current state of the autonomous vehicle;
at the processor, determining whether each of a plurality of ranked sub-states is active in the autonomous vehicle, based on the state data;
at the processor, selecting one of the lighting pattern definitions corresponding to the highest ranked sub-state determined to be active in the autonomous vehicle; and
controlling the illumination system according to the selected lighting pattern definition.

2. The method of claim 1, wherein the state data includes at least one of (i) trajectory data defining a trajectory of the autonomous vehicle, (ii) environmental data defining an object in the vicinity of the autonomous vehicle and (iii) control data defining operational parameters of the autonomous vehicle.

3. The method of claim 2, wherein the operational parameters include at least one of an operating mode identifier, a warning condition identifier and an error condition identifier.

4. The method of claim 1, further comprising:
storing the lighting pattern definitions in a plurality of lighting pattern definition subsets, each subset corresponding to one of the sub-states;
wherein selecting one of the lighting pattern definitions comprises:
selecting one of the subsets corresponding to the highest ranked sub-state determined to be active; and
selecting the one of the lighting pattern definitions from the selected subset based on the state data.

5. The method of claim 1, further comprising:
storing, in association with each lighting pattern definition, respective segment identifiers corresponding to respective segments of the illumination system;
wherein selecting one of the lighting pattern definitions comprises:
determining whether any of the lighting pattern definitions correspond to the highest ranked sub-state determined to be active;
when the determination is affirmative, selecting one of the lighting pattern definitions corresponding to the highest ranked sub-state determined to be active; and
when the determination is negative, selecting one of the lighting pattern definitions corresponding to the next highest ranked sub-state determined to be active.

6. The method of claim 5, further comprising:
repeating the selecting one of the lighting pattern definitions for each segment identifier;

wherein the controlling includes controlling each segment of the illumination system according to the corresponding selected lighting definition pattern.

7. The method of claim 6, wherein the controlling comprises:
   mixing the selected lighting pattern definitions respective to each segment of the illumination system together to generate a mixed lighting pattern definition; and
   transmitting the mixed lighting pattern definition to the illumination system.

8. The method of claim 1, further comprising:
   responsive to selecting one of the lighting pattern definitions, retrieving a previously selected lighting pattern definition;
   retrieving a transitional lighting pattern definition corresponding to the one of the lighting pattern definitions and the previously selected lighting pattern definition;
   wherein controlling the illumination system includes controlling the illumination system according to the one of the lighting pattern definitions and the transitional lighting pattern definition.

9. The method of claim 1, wherein the controlling includes transmitting the selected lighting pattern definition to an array of light emitting diodes (LEDs) mounted on the autonomous vehicle.

10. The method of claim 1, wherein the controlling includes transmitting the selected lighting pattern definition to a projector mounted on the autonomous vehicle.

11. A system for controlling an illumination system of an autonomous vehicle, the system comprising:
    a memory storing a plurality of lighting pattern definitions for controlling the illumination system;
    a processor connected to the memory and the illumination system, the processor configured to:
       receive state data defining a current state of the autonomous vehicle;
       determine whether each of a plurality of ranked sub-states is active in the autonomous vehicle, based on the state data;
       select one of the lighting pattern definitions corresponding to the highest ranked sub-state determined to be active in the autonomous vehicle; and
       control the illumination system according to the selected lighting pattern definition.

12. The system of claim 11, wherein the state data includes at least one of (i) trajectory data defining a trajectory of the autonomous vehicle, (ii) environmental data defining an object in the vicinity of the autonomous vehicle and (iii) control data defining operational parameters of the autonomous vehicle.

13. The system of claim 12, wherein the operational parameters include at least one of an operating mode identifier, a warning condition identifier and an error condition identifier.

14. The system of claim 11, the memory storing the lighting pattern definitions in a plurality of lighting pattern definition subsets, each subset corresponding to one of the sub-states;
    the processor further configured to select one of the lighting pattern definitions by:
       selecting one of the subsets corresponding to the highest ranked sub-state determined to be active; and
       selecting the one of the lighting pattern definitions from the selected subset based on the state data.

15. The system of claim 11, the memory storing, in association with each lighting pattern definition, respective segment identifiers corresponding to respective segments of the illumination system;
    the processor further configured to select one of the lighting pattern definitions by:
       determining whether any of the lighting pattern definitions correspond to the highest ranked sub-state determined to be active;
       when the determination is affirmative, selecting one of the lighting pattern definitions corresponding to the highest ranked sub-state determined to be active; and
       when the determination is negative, selecting one of the lighting pattern definitions corresponding to the next highest ranked sub-state determined to be active.

16. The system of claim 15, the processor further configured to:
    repeating the selecting one of the lighting pattern definitions for each segment identifier;
    wherein the controlling includes controlling each segment of the illumination system according to the corresponding selected lighting definition pattern.

17. The system of claim 16, the processor further configured to control the illumination system by:
    mixing the selected lighting pattern definitions respective to each segment of the illumination system together to generate a mixed lighting pattern definition; and
    transmitting the mixed lighting pattern definition to the illumination system.

18. The system of claim 11, the processor further configured to:
    responsive to selecting one of the lighting pattern definitions, retrieve a previously selected lighting pattern definition;
    retrieve a transitional lighting pattern definition corresponding to the one of the lighting pattern definitions and the previously selected lighting pattern definition;
    control the illumination system according to the one of the lighting pattern definitions and the transitional lighting pattern definition.

19. The system of claim 11, the processor further configured to control the illumination system by transmitting the selected lighting pattern definition to an array of light emitting diodes (LEDs) mounted on the autonomous vehicle.

20. The system of claim 11, the processor further configured to control the illumination system by transmitting the selected lighting pattern definition to a projector mounted on the autonomous vehicle.

* * * * *